United States Patent
Shimane

(12) United States Patent    (10) Patent No.: US 6,193,271 B1
(45) Date of Patent: *Feb. 27, 2001

(54) AUTOMOTIVE AIR BAG DEVICE

(75) Inventor: Junichi Shimane, Tokyo (JP)

(73) Assignee: Kansei Corporation (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/048,602

(22) Filed: Mar. 26, 1998

(30) Foreign Application Priority Data

Mar. 31, 1997 (JP) .................................... 9-079730

(51) Int. Cl.[7] ............ B60R 21/20; B60R 21/16
(52) U.S. Cl. .................. 280/728.3; 280/728.2; 280/732
(58) Field of Search ............ 280/743.1, 743.2, 280/728.1, 732, 728.3, 728.2

(56) References Cited

U.S. PATENT DOCUMENTS

| | | | |
|---|---|---|---|
| 5,332,257 | * 7/1994 | Rogers et al. | 280/732 |
| 5,398,961 | * 3/1995 | Rogers et al. | 280/732 |
| 5,524,922 | * 6/1996 | Soderquist | 280/728.1 |
| 5,527,063 | * 6/1996 | Garner et al. | 280/743.1 |
| 5,630,610 | * 5/1997 | Murakami et al. | 280/728.1 |
| 5,851,023 | * 12/1998 | Nagata et al. | 280/728.3 |
| 5,873,596 | * 2/1999 | Kantoh et al. | 280/728.2 |
| 5,884,939 | * 3/1999 | Yamaji et al. | 280/743.1 |

FOREIGN PATENT DOCUMENTS 6-23845   3/1994   (JP) .

* cited by examiner

*Primary Examiner*—Michael Mar
*Assistant Examiner*—Hau Phan
(74) *Attorney, Agent, or Firm*—Morrison Law Firm

(57) ABSTRACT

An automotive air bag device offers ready installation in an automobile instrument panel while reducing material and assembly costs and maintaining its structural integrity when activated. An air bag inflation opening, formed in the instrument panel, is surrounded by an internal reinforcement wall. An air bag lid, which covers the opening, includes an inwardly directed leg which engages the reinforcement wall. A case, which supports an inflator and a diffuser, is fastened to the leg on the lid.

9 Claims, 4 Drawing Sheets

AUTOMOTIVE AIR BAG DEVICE

BACKGROUND OF THE INVENTION

The present invention relates to an automotive air bag device and, more particularly, to an automotive air bag device wherein the air bag inflation opening is formed in an automotive panel such as an instrument panel or a door panel, and this opening is covered with an air bag lid.

Referring to FIG. 4, there is shown a conventional passenger-side automotive air bag device 2 disposed in an automobile instrument panel 1. In the illustration, air bag 2 device is installed at an angle that allows it to be easily viewed in the drawing. This does not necessarily correspond to actual installation angles.

Instrument panel 1 is formed of a two-layer material including a core material 1a and a surface material 1b. A rectangular air bag inflation opening 1c is formed at a prescribed position on instrument panel 1.

Air bag device 2 includes a semi-cylindrical metal case 4 fixed to a vehicle body via a bracket 3. An inflator 5, housed in case 4, inflates an air bag 6 when inflator 5 is activated. A metal guide member 8 is fixed to case 4 by a plurality of mechanical fasteners 7,7 (only two are shown). An air bag lid 10 is fixed to guide member 8 by a plurality of mechanical fasteners 9,9 (only two are shown). These elements are assembled to the vehicle body as a single unit.

Air bag lid 10 covers opening 1c of instrument panel 1. Air bag lid 10 includes a main lid unit 10b having a scoreline 10a. Legs 10c, projecting from the back surface of main lid unit 10b, are fastened to guide member 8 so as to retain lid 10 when air bag 6 inflates.

In air bag device 2, bracket 3, case 4, inflator 5, air bag 6, guide member 8, and air bag lid 10 comprise a subassembly. When installing this subassembly in the vehicle body, the proper alignment of air bag lid 10 with opening 1c is difficult to achieve. Proper alignment requires the edges of opening 1c and the outer edges of air bag lid 10 be aligned both along the plane of the opening and along the depth axis, i.e. alignment must be performed in three dimensions. If perfect alignment is not achieved, the cosmetic appearance of instrument panel 1 will suffer.

Furthermore, the inclusion of guide member 8, which maintains subassembly integrity when air bag 10 inflates, increases the size of air bag device 2, thus making the alignment operation described above even more difficult. Finally, the subassembly includes a substantial number of parts, so that material and assembly costs are high.

OBJECTS AND SUMMARY OF THE INVENTION

It is a primary object of the present invention to overcome the problems described above by providing an automotive air bag device wherein the air bag lid can be easily aligned with the automotive panel.

It is a further object to provide an automotive air bag device which offers reduced material and assembly costs while maintaining its structural integrity when the inflator is activated.

Briefly stated, the present invention provides an automotive air bag device which offers ready installation in an automobile instrument panel while reducing material and assembly costs and maintaining its structural integrity when activated. An air bag inflation opening, formed in the instrument panel, is surrounded by an internal reinforcement wall. An air bag lid, which covers the opening, includes an inwardly directed leg which engages the reinforcement wall. A case, which supports an inflator and a diffuser, is fastened to the leg on the lid.

According to an embodiment of the invention, there is provided an automotive air bag device comprising: an automotive panel having an inner surface and defining an air bag inflation opening, a reinforcement wall on the inner surface of the instrument panel, surrounding the air bag inflation opening, an air bag lid, a leg projecting from the air bag lid and engageable with the reinforcement wall to retain the air bag lid in covering relation to the air bag inflation opening, a case attached to the leg, and an inflator disposed within the case.

According to a feature of the invention, there is provided an automotive air bag installation comprising: an instrument panel, an air bag opening in the instrument panel, an air bag lid, the air bag lid fitting the air bag opening and forming a contiguous portion of the instrument panel, at least one projection on one of the air bag lid and the instrument panel, an engagement portion on the other of the air bag lid and the instrument panel, the projection and the engagement portion interengaging when the air bag lid is inserted into the air bag opening, and a resulting interengagement being effective for retaining the air bag lid in position in the air bag opening whereby the air bag lid is installed by the insertion.

These objects are achieved by an air bag device wherein an air bag inflation opening is formed in the automobile panel, with a reinforcement wall surrounding the back side of the opening. An air bag lid, which covers the opening, includes an inwardly directed leg which is fastened to the reinforcement wall. A case, which supports an inflator and a diffuser, is also fastened to the leg on the lid.

The above, and other objects and advantages of the present invention will become apparent from the following description read in conjunction with the accompanying drawings, in which like numerals designate the same elements.

DETAILED DESCRIPTION OF THE PREFERRED EMBODIMENT

Figure 1:
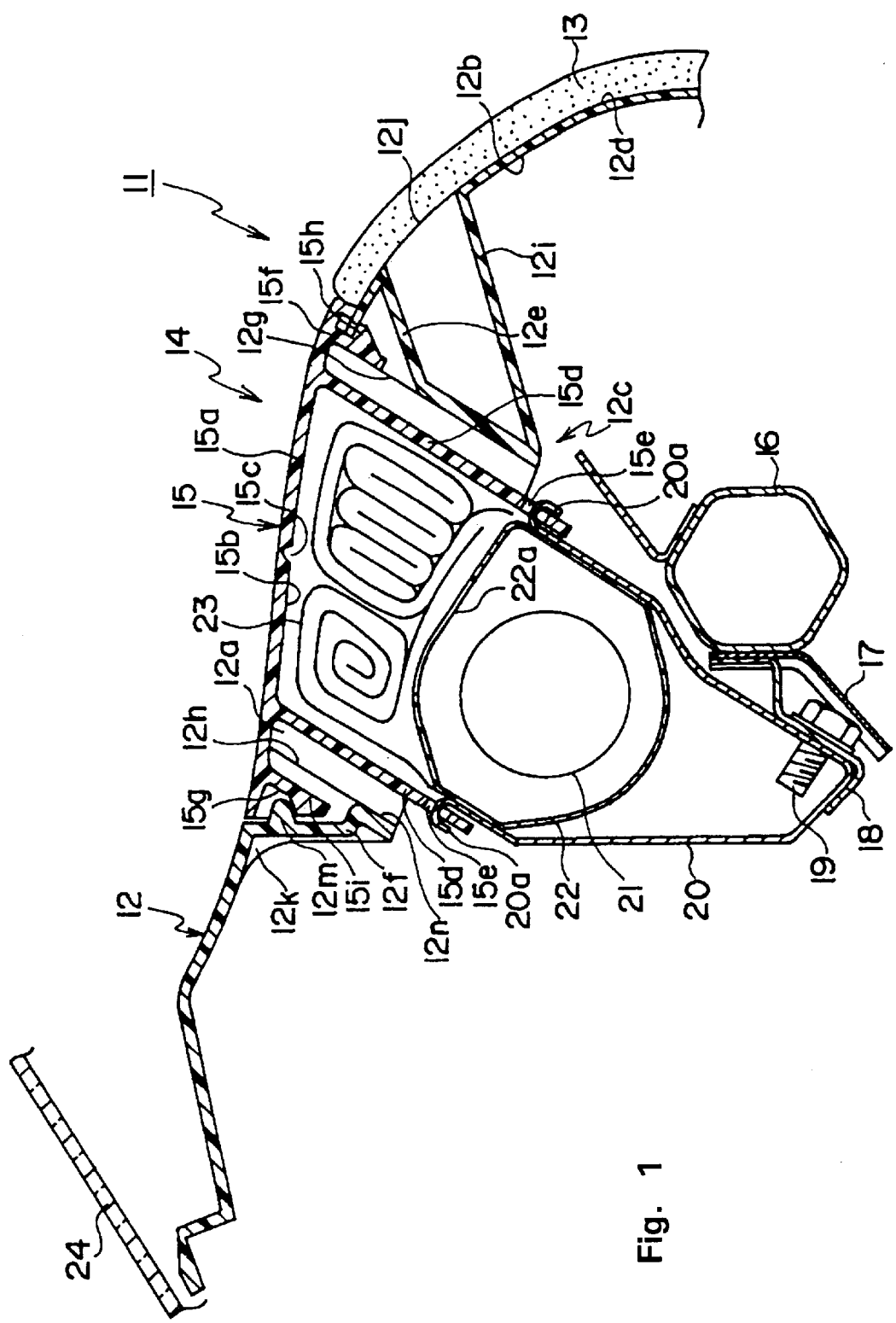
FIG. 1 is a cross-section view of an automotive air bag device according to the present invention.

Referring now to FIG. 1, there is shown an automobile instrument panel 11 fabricated from a core material 12 partially covered by a surface material (elastic pad member) 13. On the upper surface of instrument panel 11, toward the passenger seat side, there is disposed an air bag device 14.

A substantially rectangular opening 12a is formed in core material 12. A reinforcement wall 12c surrounds a back surface 12b of opening 12a.

Walls 12e, 12f, forming a part of reinforcing wall 12c, are sloped from surface 12d toward the center of opening 12a. On walls 12e, 12f, a plurality of comb-like ribs 12g, 12h are formed generally perpendicular to surface 12d and have distal edge surfaces substantially parallel to legs 15d of air bag lid 15.

A reinforcement wall 12i is formed behind wall 12e and parallel thereto. A plurality of ribs 12j is formed between reinforcement wall 12i and wall 12e. The end surfaces of ribs 12j are formed along surface 12d of core material 12.

Figure 2:
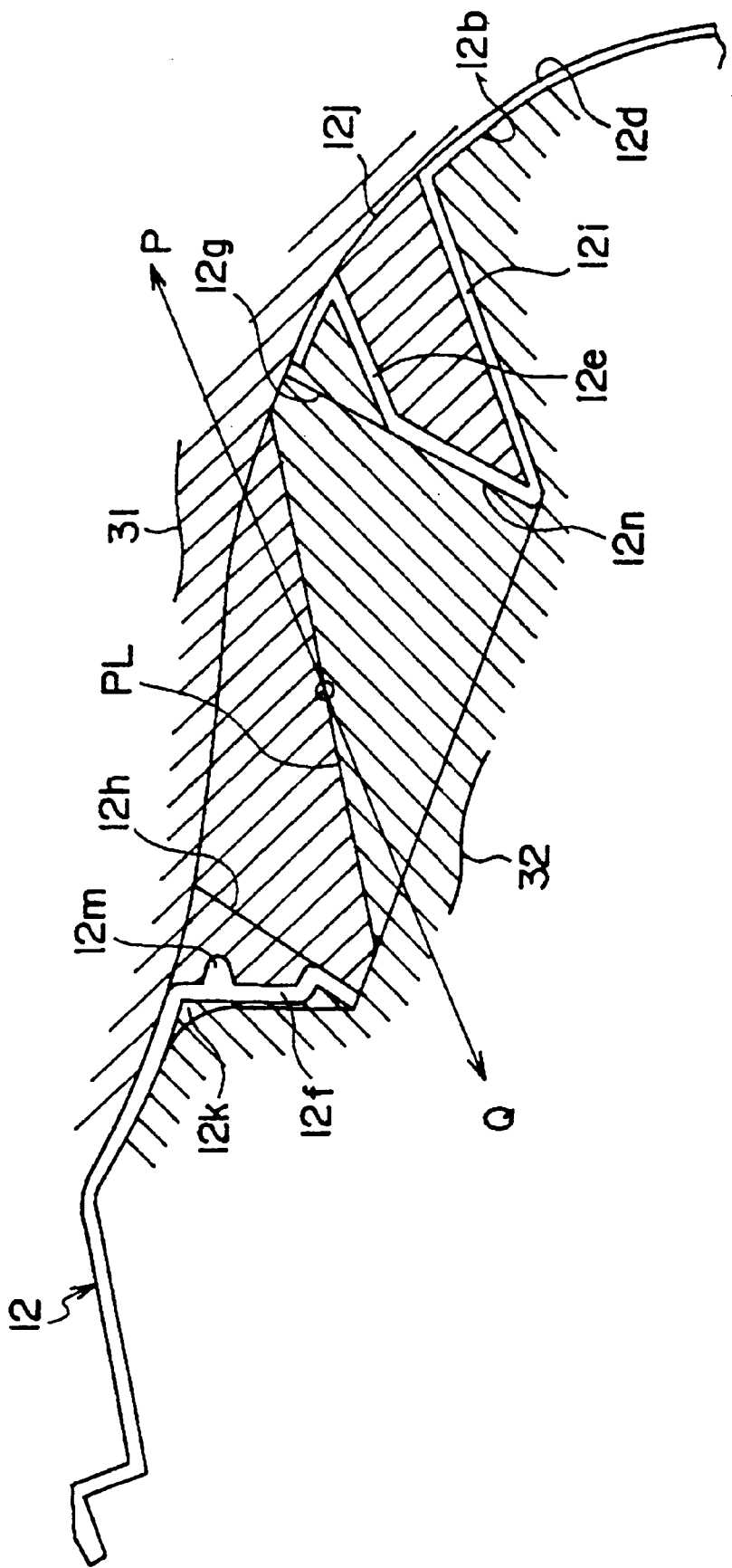
FIG. 2 is a cross-section view illustrating fabrication of the core material of the instrument panel.

Referring to FIG. 2, there is shown a parting line PL between upper and lower dies 31, 32 used to mold core material 12. Parting line PL is set to lie on a line connecting the area around the upper end of rib 12g and the area around the bottom end of wall 12f. Wall 12e is positioned so that it is sloped lower than the bottom end of wall 12f. Thus, when core material 12 is to be removed from the mold, upper and lower dies are pulled away in the same direction as the incline angle (see arrows P, Q in FIG. 2). This prevents undercutting, thus allowing the dies to be made inexpensively and easily without requiring a slide or the like to be disposed on the die.

A plurality of ribs 12k is formed behind wall 12f in a manner similar to ribs 12h. A lance 12m projects from the surface of wall 12f. Ribs 12g, 12h and the portion positioned on a line extending downward from this end surface together form inner wall 12n.

In addition to instrument panel 11 described above, air bag device 14 further includes an air bag lid 15 formed from a thermoplastic elastomer or the like and supported by core material 12 so as to cover opening 12a. A case 20 is fastened by brackets 17, 18 and a bolt 19 to a steering support member 16, which is in turn fixed to the vehicle body. A diffuser 22, supported by case 20, houses an inflator 21. A folded air bag 23, stored in a space defined by case 20 and leg 15d, is connected to the gas discharge opening 22a of diffuser 22. Referring to FIG. 1, there is also shown a front window glass 24.

Figure 3:
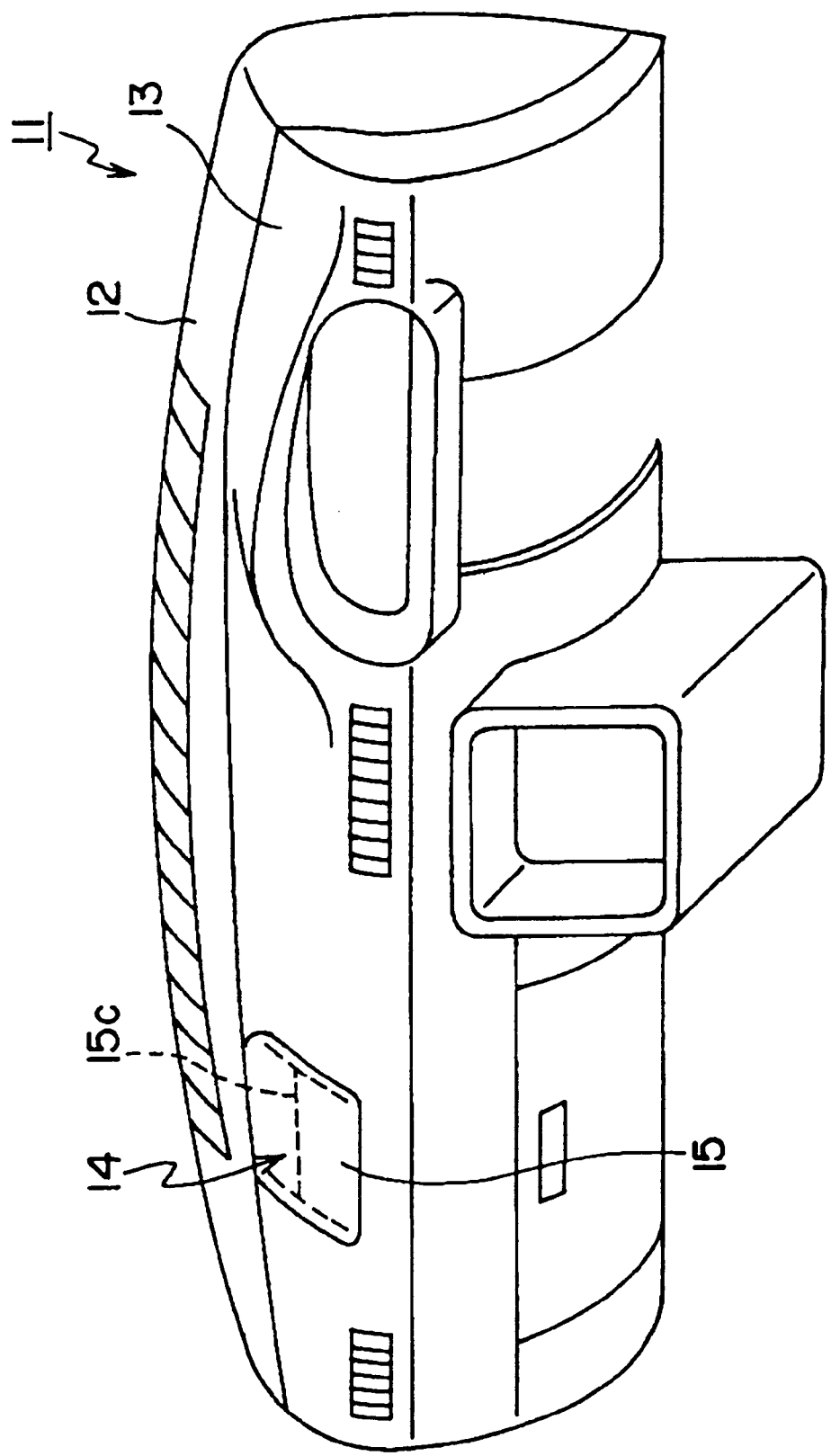
FIG. 3 is a perspective view of an instrument panel in which the air bag has been installed.
Figure 4:
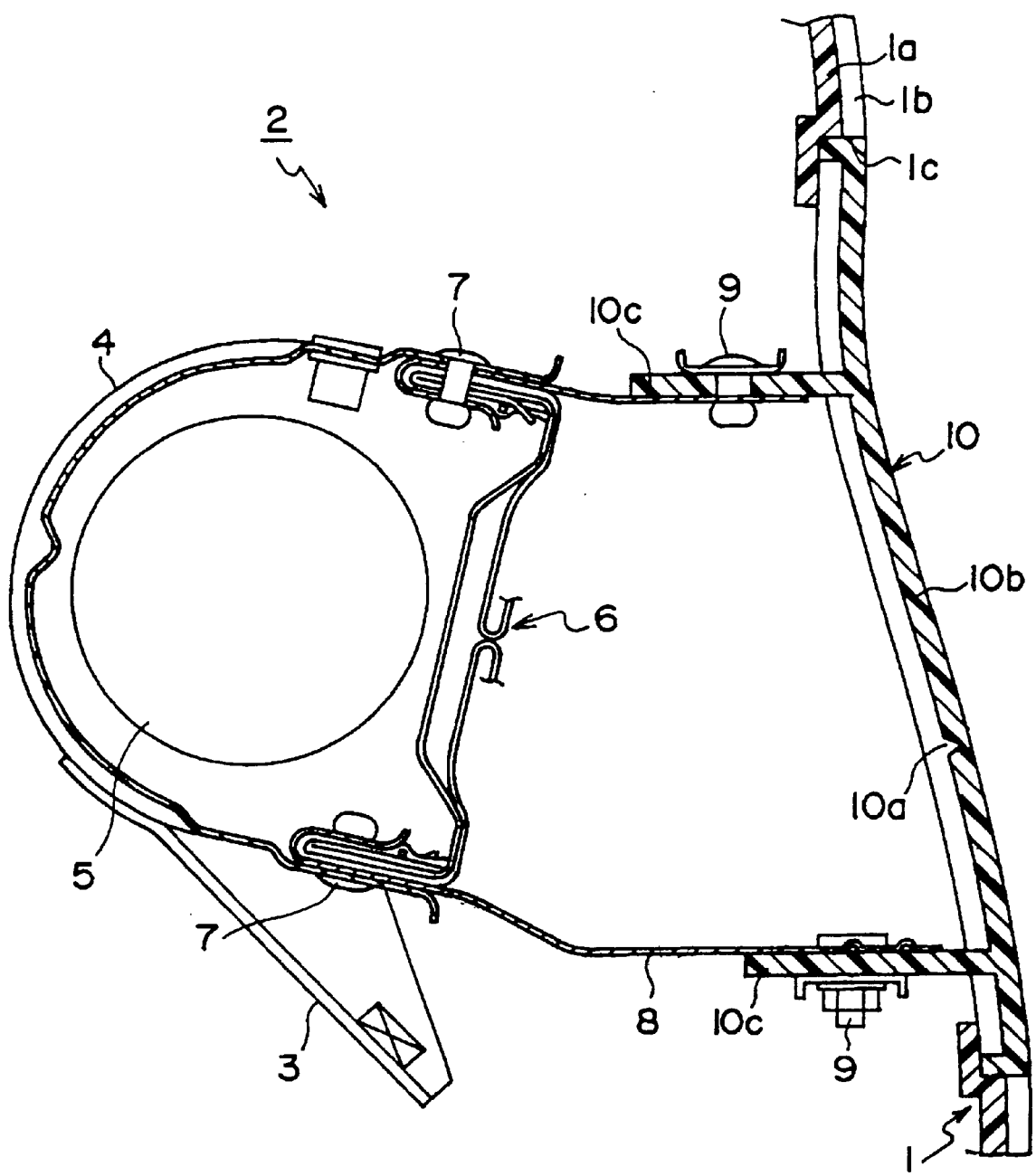
FIG. 4 is a cross-section view of a conventional automotive air bag device.

Air bag lid 15 includes a cover 15a contiguous and blending smoothly with the surface of instrument panel 11. A generally H-shaped score line is formed on the back surface 15b of cover 15a (see FIG. 1, FIG. 3). A leg 15d projects from back surface 15b of cover 15a so that it faces inner wall 12n of reinforcement wall 12c. Engagement openings 15e, 15e (only two are shown) are formed at a plurality of prescribed positions toward the bottom end of leg 15d. Engagement piece 15f and engagement portion 15g project from back surface 15b of cover 15a, extending out from leg 15d which is positioned between rib 12g and rib 12h. Cover 15a is positioned flush with surface material 13, thus providing improved cosmetic appearance.

A lance 15h, formed on engagement piece 15f, engages the upper end of reinforcement wall 12c. A second lance 15i, formed on engagement portion 15g, engages lance 12m. This allows air bag lid 15 to be supported by reinforcement wall 12c so that opening 15a is covered. It will be appreciated that lance 15h can engage reinforcement wall 12c without requiring a special engagement opening. Thus, the loss of strength accompanying the presence of an engagement hole is avoided.

Hooks 20a, 20a, which engage engagement opening 15e, are formed integrally with or are fixed to the end of case 20 to provide a connection with air bag lid 15.

To assemble air bag device 14 described above, opening 12a and reinforcement wall 12c are formed in core material 12. Next, lance 15i of engagement portion 15g is engaged with lance 12m, and lance 15h is engaged with the upper end of reinforcement wall 12c. Thus, air bag lid 15 is supported by reinforcement wall 12c so as to cover opening 12a. Air bag lid 15 is directly supported by core material 12. This makes it possible to easily perform three-dimensional alignment of air bag lid 15 relative to opening 12a.

Air bag 23 and diffuser 22 are fixed to cover 20, with a portion of air bag 23 covering diffuser 22. Hooks 20a, 20a are then engaged with engagement openings 15e, 15e and cover 20 is mounted on steering support member 16.

The size of engagement opening 15e is such that the relative positioning between cover 20 and steering support member 16 remains fixed, and also so that relative positioning between air bag lid 15 and opening 12a does not change due to looseness and the like during the assembly process.

When inflator 21 is activated, air bag 23 inflates and presses against leg 15d and inner wall 12n, as well as cover 15a of air bag lid 15. Cover 15a breaks open at score line 15c so that air bag 23 may inflate outwardly. Thus, subassembly integrity is maintained without the use of guide member 8 shown in the conventional technology.

When air bag 23 inflates, upward pressure is generated on cover 15a, but this pressure is absorbed by lance 15h and hook 20a of cover 20, thus preventing air bag lid 15 from separating from instrument panel 11.

Having described the presently preferred embodiment of the invention with reference to the accompanying drawings, it is to be understood that the invention is not limited to the precise embodiment described, and that various changes and modifications may be effected therein by one skilled in the art without departing from the scope or spirit of the invention as defined in the appended claims.

What is claimed is:

1. An automotive air bag device comprising:
   an automotive panel having an inner surface and defining an air bag inflation opening;
   a reinforcement wall on said inner surface of said automotive panel, surrounding a perimeter edge of said air bag inflation opening;
   an air bag lid;
   a leg projecting from said air bag lid;
   an engagement piece disposed on said air bag lid, engaging with said perimeter edge of said air bag inflation opening of said automotive panel, thereby sealing said air bag inflation opening;
   said reinforcement wall having a portion displaced from said inner-surface of said automotive panel, said portion being proximal to and substantially parallel with said leg along substantially an entire length of said leg;
   a case attached to said leg;
   an air bag;
   said air bag being folded and stored in a space defined by said case and said leg when said automotive air bag device is installed in a vehicle; and
   an inflator disposed within said case.

2. The automotive air bag device of claim 1, wherein said reinforcement wall defines a wall surface inclined from said automotive panel toward the center of said air bag inflation opening, said reinforcement wall including at least one rib projecting from said wall surface and generally perpendicular to said automotive panel, said rib having a distal edge which is substantially parallel to said leg when said leg is engaged with said reinforcement wall.

3. The automotive air bag device of claim 1, wherein said air bag lid is formed of a thermoplastic elastomer material.

4. The automotive air bag device of claim 1, wherein a surface of said air bag lid defines a generally H-shaped score line adapted to rupture when said inflator is activated.

5. The automotive air bag device of claim 1, wherein said automotive panel is an instrument panel.

6. The automotive air bag device of claim 1, further comprising a vehicle body, said case being fastened to said vehicle body.

7. The automotive air bag device of claim 6, further comprising a steering support member fastened to said vehicle body, said case being fastened to said steering support member.

8. An automotive air bag installation comprising:

an instrument panel;

an air bag opening in said instrument panel;

a reinforcement wall at a perimeter edge of said air bag opening;

an air bag lid;

said air bad lid fitting said air bag opening and forming a contiguous portion of said instrument panel;

at least a portion of said reinforcement wall forming a projection from said instrument panel;

an engagement portion on said air bag lid;

said reinforcement wall and said engagement portion interengaging when said air bag lid is inserted into said air bag opening;

a resulting interengagement between said reinforcement wall and said engagement portion being effective for retaining said air bag lid in position in said air bag opening whereby said air bag lid is installed by insertion into said air bag opening;

a leg projecting from said air bag lid;

said leg being positioned adjacent to and substantially parallel with said projection, forming a space thereaong;

said projection having a length sufficient to substantially enclose said leg;

a case attached to said leg;

an air bag; and said air bag being folded and stored in a space defined by said case and said leg when said automotive air bag device is installed in a vehicle.

9. An automotive air bag installation according to claim 8, further comprising:

at least one rib in said air bag opening; and said at least one rib guiding said air bag lid during installation thereof.

\* \* \* \* \*